(No Model.)
A. O. GRANGER.
SCRUBBER FOR GAS WORKS.
No. 340,998. Patented May 4, 1886.
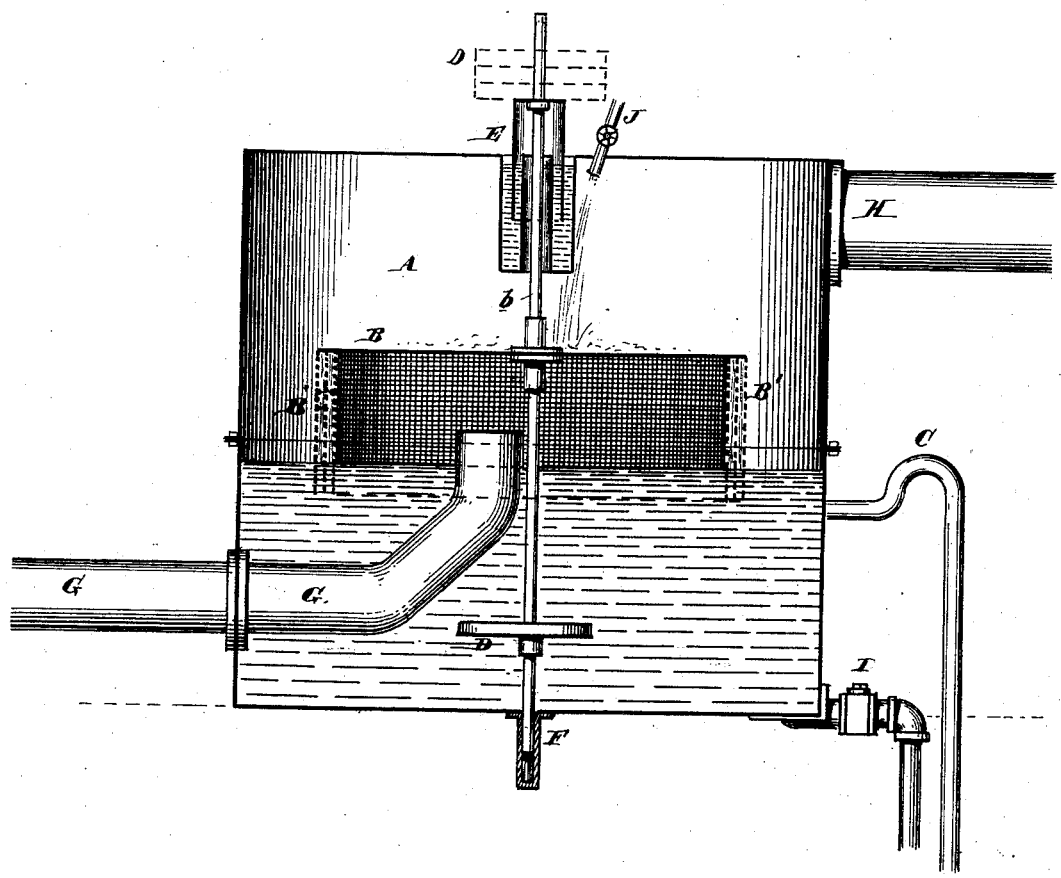

United States Patent Office.

ARTHUR O. GRANGER, OF PHILADELPHIA, PENNSYLVANIA, ASSIGNOR TO THE UNITED GAS IMPROVEMENT COMPANY, OF SAME PLACE.

SCRUBBER FOR GAS-WORKS.

SPECIFICATION forming part of Letters Patent No. 340,998, dated May 4, 1886.

Application filed December 26, 1884. Serial No. 151,161. (No model.)

*To all whom it may concern:*

Be it known that I, ARTHUR O. GRANGER, of the city and county of Philadelphia and State of Pennsylvania, have invented a new and useful Improvement in Scrubbers for Gas-Works, of which the following is a specification.

My invention has reference to improvements in condensers or scrubbers for gas apparatus; and it consists in a tank partly full of water, provided with an inlet and an outlet for the gas, and combined with an automatic floating screen, through which the gas is caused to pass, the said screen being adapted to dip into the water and expose a greater or less surface for the passage of gas, in accordance with the production; further, in providing the above with suitable water-supplying apparatus, by which the said screens are kept constantly covered with water, which is allowed to trickle or flow over the same, and through which the gas is required to pass; and in many details of construction, all of which are fully set forth in the following specification and shown in the accompanying drawing, which forms part thereof.

Heretofore scrubbers and condensers were made with surfaces having a fixed area, through the perforations of which the gases were required to pass. The area of said surfaces were independent of the quantity of gas produced and required to pass through the said scrubber or condenser.

The object of my invention is to provide a scrubber or condenser which shall present a proportionally-increased screen-area as the quantity of gas to be purified is increased, and vice versa, thus insuring a far greater purification of the gas.

In the drawing is shown a sectional elevation of a condenser or scrubber embodying my improvements.

A is the cylindrical shell of the condenser or scrubber.

G is the inlet-pipe, which enters somewhat near the bottom and is turned up so as to open into the interior of said shell a little above the water-level and close to the center, and H is the outlet for the gas, which leads to the holder.

B is a drum, preferably cylindrical in shape, having a solid top or head, and provided with sides formed of one or more sheets of perforated metal or wire-gauze. This drum is without a bottom, and is sealed by the water, which is admitted by the pipe J, and, after flowing over the drum B, is received in the tank A and keeps up the water-level, which is made constant by an overflow, C, which overflow C is made inverted-U-shaped, and passes into the tank A at some distance below the water-level, as shown, thereby allowing it to draw off the clear water, leaving light oily matter floating on the top of the water in the tank A and in contact with the circulating gas.

D is a pan secured to the vertical rod $b$, to which the drum B is secured, and may be weighted, so as to act as a resistance to the upward tendency of the drum B when gas is passing, and this weight is so adjusted as to cause the gas to pass through the screens B' under pressure, and whereby the attrition in passing through the small holes breaks up the vesicles or globules of tarry or oily matter, and effectually removes them and other foreign matters from the gas, which substances run down the vertical sides of the drum or screens into the water, and the pressure under which the gas passes through the screens keeps the holes or apparatus free and clean.

Guides are formed at E and F to insure the drum B remaining in the proper position and allowing free vertical and rotary motion of the same.

The water and deposits from the tank or box A may be drawn off by the pipe I.

The pan D may be provided with removable weights, or one solid weight may be attached to the rod L or drum B at any convenient place; or, if desired to vary the pressure, then the rod $b$ may extend up through the stuffing-box at E and be arranged to receive weights, which may be varied at pleasure, as indicated at dotted lines.

While I prefer the construction shown, I do not limit myself to the details thereof, as they may be modified in various ways without departing from my invention.

Having now described my invention, what I claim as new, and desire to secure by Letters Patent, is—

1. A scrubber or condenser for purifying gas, consisting of a tank partly full of water and furnished with an inlet, G, and an outlet, in combination with a drum having a solid top and a screen-surface forming its vertical walls which dips down into the water, guides for said drum or its supporting-rod, by which it may rise and fall with the varying pressures of gas which is caused to pass through the same, and a water-supply pipe to cause a constant stream of cold water to flow upon the solid top of said drum and spread out and run down over the screen-surface, to wash and purify the gas, substantially as and for the purpose specified.

2. In a scrubber or condenser for purifying gas, the combination, with an adjustable screen through which the gas must pass, whereby a greater or less surface may be presented, of a gas-inlet pipe having an exit under said screen and water-supply pipes to keep a flow of water over said screen-surface, substantially as and for the purpose specified.

3. In a scrubber or condenser for purifying gas, the combination, with an adjustable screen through which the gas must pass, whereby a greater or less surface may be presented, of a gas-inlet pipe having an exit under said screen, water-supply pipes to keep a flow of water over said screen-surface, and an overflow for the water opening from the condenser some distance below the level of the water, whereby oily matters are retained in the condenser, substantially as and for the purpose specified.

4. The combination of tank A, having gas inlet G and outlet H, drum B, having screens B', rod b, weight-tray D, and suitable guides for said drum, substantially as and for the purpose specified.

5. The combination of tank A, having gas inlet G and outlet H, water-pipe J, drum B, having screens B', rod b, weight-tray D, and suitable guides for said drum, substantially as and for the purpose specified.

In testimony of which invention I have hereunto set my hand.

ARTHUR O. GRANGER.

Witnesses:
R. M. HUNTER,
WILLIAM C. MAYNE.